Figure 1:
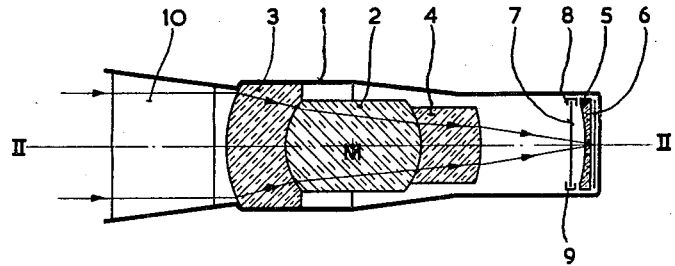

Feb. 2, 1960

A. BOUWERS 2,923,220

PANORAMIC CAMERA

Filed Nov. 13, 1956

4 Sheets-Sheet 1

INVENTOR.
A. BOUWERS
BY
*Wenderoth, Lind & Ponack*
ATTYS.

Feb. 2, 1960

A. BOUWERS 2,923,220

PANORAMIC CAMERA

Filed Nov. 13, 1956

4 Sheets-Sheet 3

INVENTOR.
A. BOUWERS
BY

Feb. 2, 1960   A. BOUWERS   2,923,220
PANORAMIC CAMERA
Filed Nov. 13, 1956   4 Sheets-Sheet 4

INVENTOR.
A. BOUWERS
BY

United States Patent Office 2,923,220
Patented Feb. 2, 1960

2,923,220
PANORAMIC CAMERA

Albert Bouwers, The Hague, Netherlands, assignor to N.V. Optische Industrie "De Oude Delft," Delft, Netherlands Application November 13, 1956, Serial No. 621,794

Claims priority, application Netherlands June 4, 1956

13 Claims. (Cl. 95—16)

The invention relates to a panoramic camera, i.e. a camera whose field of view in one direction is considerably larger than the field of view in the direction perpendicular thereto.

For the photographing of pictures one dimension of which is much larger than the other (panoramas), various methods are conceivable and have in fact found practical application. With one of these methods use is made of a camera lens which, during the taking of the photograph, is moved by a driving mechanism along a stationary strip of film. Another method consists fundamentally in using a number of separate cameras mounted side by side, each of which covers its own particular portion of the total angular field desired. With these cameras, photographs are taken simultaneously which, when placed alongside each other, form the panoramic picture.

However, the two methods mentioned, in common with other known procedures, entail the drawback that the apparatus used is expensive and unwieldy.

The invention aims at providing a camera of the type indicated which covers in one direction a field up to 360° and which takes the photograph in one single exposure with a single, stationary optical system, using standard perforated or unperforated film.

According to the invention a panoramic camera has an optical system substantially in the shape of a transparent disk whose external and internal refractive surfaces are spherical and substantially concentric with each other. Light rays enter the optical system through an aperture in the housing of the camera which is located in front of an entrance area on the external surface of the transparent disk, and leave the system through an exit area on this external surface which is positioned substantially radially opposite the entrance area of this surface. In the path of the light rays and opposite the exit area a transparent substantially cylindrically shaped film carrier is provided upon whose outer surface which coincides with the focal surface of the optical system a strip of film may be placed. In order to prevent light rays not substantially radial to the optical system from entering a stop means is disposed in front of the entrance area of the system.

The optical system used has an image surface which, like all the concentric surfaces in the system, is spherically curved in such a way that the centre of the optical system is also the centre of the image surface. As the dimension of the panoramic image in the direction perpendicular to the end faces of the spherical segment is considerably smaller than the dimension in the plane of the spherical segment, in many cases a cylindrical surface will constitute a sufficient approximation to the exact shape of the image surface. The film carrier thus may assume the simple form of a cylindrically curved shell of transparent material against which the film can be placed. However, if very high standards are stipulated for the resolving power of the optical system, the above-mentioned approximation as to the shape of the film carrier is no longer possible and one has to use a spherically curved film carrier around which the film is stretched. This is not a serious drawback in practice, as the deviations from the cylindrical shape will in any case be very slight.

However, according to the invention an advantage may be gained by optically distorting the image surface to a purely cylindrical surface, which is achieved by interposing between the optical system and the film support, coaxially with the film carrier, a cylindrically curved, transparent body whose surface facing the optical system and/or whose surface facing the film support is/are concavo-toric in form. This body—which, for brevity's sake, will hereinafter be designated as "the image-flattening lens"—thus serves to lengthen the optical path of the light-rays which will form the edge portions of the image (considered with respect to the shortest dimension of the image) by such an amount with respect to the rays corresponding to the middle portion of the image that all points in the image will be situated at substantially equal distances from the axis of the film carrier.

According to the invention it is expedient for the image flattening lens to be so shaped that only its inner surface is toric in form, whilst the outer surface is given a cylindrical form enabling it to be used as film carrier. In this way the image flattening lens is situated at the shortest possible distance from the image surface, with the result that any aberrations introduced by this lens will have little effect on image quality; moreover, for the same reason the toric inner surface of the lens need not be made with very great precision. The flattening lens may, for instance, be ground and polished on a lathe.

When using a camera according to the invention whose field of view in the direction of its largest dimension is smaller than about 120°, it is possible in some cases to use a central diaphragm or stop. In this case the optical system is divided into two parts by a plane passing through its centre which is perpendicular to the optical axis of the camera, in which dividing plane there is provided a disk with a central aperture which limits the aperture of the optical system in the same way as does a stop in an ordinary camera. With such a central diaphragm, however, a disagreeable feature peculiar to all known types of large-angle lenses is in evidence, viz., the luminosity of the image diminishes in a very marked degree towards the edges. In the invention, therefore, the limitation of the aperture of the optical system to the desired value will preferably be effected by an altogether different form of design whereby this aperture, except for slightly variations, is the same for every point on the image surface. It will be found that for an angular field of from 120° to 180° in the direction of the largest dimension, for which a central diaphragm is practically unserviceable on account of the marked decrease in luminosity towards the edges, and for a field larger than 180°, for which a central stop, of course, is impossible, the type of diaphragm according to the invention offers a very simple and neat solution of the aperture limiting problem.

According to the invention the diaphragm is in this case situated in front of the entrance surface of the optical system and comprises a plurality of thin, opaque, flat plates evenly distributed over the entrance surface, said plates being in planes substantially radial with respect to the axis of the film carrier. The aperture for the beams of light entering the optical system is limited in the direction of their widths by these plates, a portion of the light-rays in these beams, not entering the camera radially, being intercepted by the plates. Each stop plate thus gives a shadow for each direction of the incident light, the effect being such that shadows of adjacent plates overlap in the case of a direction deviating from the radial by more than a certain angle. With this type of diaphragm the effective aperture of the system is obviously determined by the length of the plates (i.e. their radial dimension) and by the spacing between them. This effective aperture can be made practically equal for all points on the image surface, so that a uniform illumination of the image face is obtained.

The shutter of the camera may, according to the invention, be constructed for instance as a cylindrically curved vertical or horizontal slit shutter situated at the exit or entrance side for light rays of the optical system. In some case it will be found expedient to use, instead of this shutter, a light-tight ring or portion of a ring which is positioned coaxially with the film carrier in the path of the light-beams and which can be moved up and down by a driving mechanism.

In another advantageous embodiment of the camera according to the invention a shutter is provided comprising a plurality of blades spaced at regular distances from each other in front of the outermost spherical shell on the entrance surface of the optical system, all of these blades being rotatable on spindles substantially parallel to the film carrier axis, and further comprising means whereby the shutter blades can be moved from the rest position in which they shut off the light from the entrance surface of the optical system, to the radial position required for exposure.

The driving means may comprise, for instance, a central cog wheel or cog rim of large diameter in mesh with small cog wheels fitted to the spindles of the shutter blades. By rotating the central cog wheel through a small predetermined angle, all the shutter blades are made to rotate through an angle of 90°, thereby clearing the optical system for an exposure. The shutter blades can then be turned back or turned forward in the same direction, so that the shutter is again closed. With the latter method the moving back of the shutter blades through an angle of over 180° to the initial position is effected only at the next exposure. Owing to the fact that the shutter blades and the diaphragm plates described above may be similarly shaped, whilst the diaphragm plates of course only enter into play when the lens is open, it is in some cases possible according to the invention to combine the two functions into one set of blades or plates.

When a larger angular field than 180° is desired, this can be achieved according to the invention if the zones on the outer surface of the spherical segment through which the rays pass into or out of the optical system, viewed in a direction perpendicular to the end faces of the spherical segment, are situated one above the other and are overlapping each other in a tangential direction. In this way different levels, as it were, are formed around the spherical segment, viz., one or two entrance levels on which the diaphragm and shutter may be mounted and on which the light rays enter the system, and the exit level, situated above or below the entrance level or between two entrance levels, on which the rays emerge from the system in a direction approximately diametrically opposite their point of incidence and on which the film support is mounted. In the extreme case of a panoramic camera for a visual field of 360° the two levels extend around the entire spherical segment. The light-beams originating from diametrically opposite points of the field intersect at some point or other inside the optical system, traversing the latter in approximately opposite directions.

In the camera according to the invention it is generally desirable to make the top and bottom faces of the optical system rough and to lacquer them with a dull finish in order to minimize reflection of light rays at these surfaces. This applies in particular to a camera of the type just mentioned having a field larger than 180°, in which case the desire to have the largest possible field of view in the second direction, combined with the requirements to be observed in the manufacture of the camera lens, may result in an arrangement in which the effective light-rays brush very closely and at a very small angle along the end faces of the spherical segment. The reflection of these light-rays may thereby have an adverse effect upon the brilliancy of the image obtained.

According to the invention it may be found expedient under such circumstances to make the above-mentioned end faces concave and to cement on to them similarly shaped disks of transparent material whose index of refraction is equal to or differs but slightly from those of the materials of which the spherical segment is made. There will then be practically no reflection at these surfaces, a feature that is conducive to good quality of the image.

It is to be noted that concentric spherical systems of the kind referred to are known in themselves. As early as 1859, in the British Patent 2,193/1859, Sutton indicated an optical system consisting of concentric spherical shells, into which a liquid was introduced.

Of more recent date is the system, likewise concentric, reproduced in the Manual of Photogrammetry of the America Society of Photogrammetry, 2nd edition, Fig. 12B. The optical system of this wide-angle camera is in the shape of a sphere formed by concentric spherical shells and two hemispherical cores and gives a concentric, spherically curved image face. The emulsion support consist in this case of precisely ground, bowl-shaped glass bodies on to which the sensitive emulsion is poured. The diaphragm is positioned in the centre of the system. The manufacture of the spherical emulsion supports is difficult, whilst the handling of these parts during photography is cumbrous and delicate. Another drawback is that no suitable shutter can be provided. For these reasons the system has not found acceptance. Besides, it will be understood that this already disclosed system is restricted for principal reasons to a visual field of less than 180°.

Figure 2:
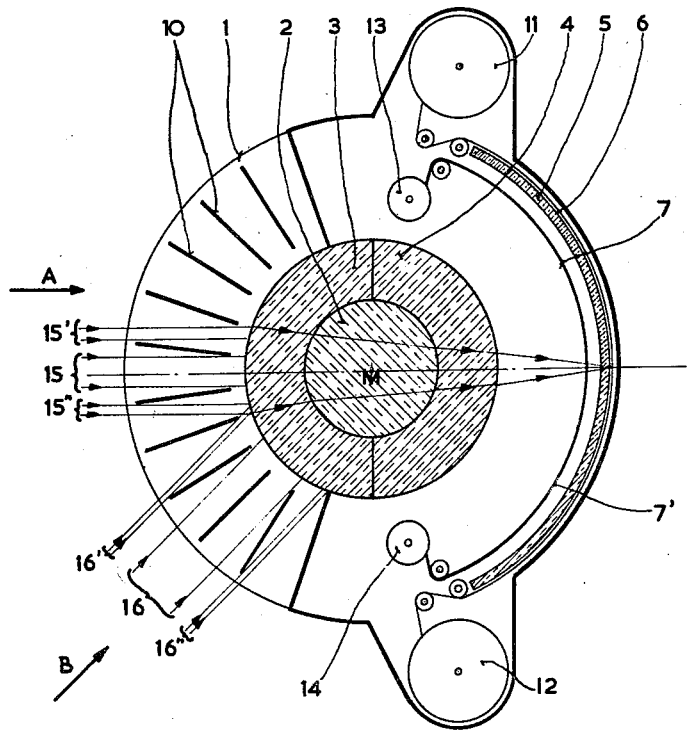
Figure 4:
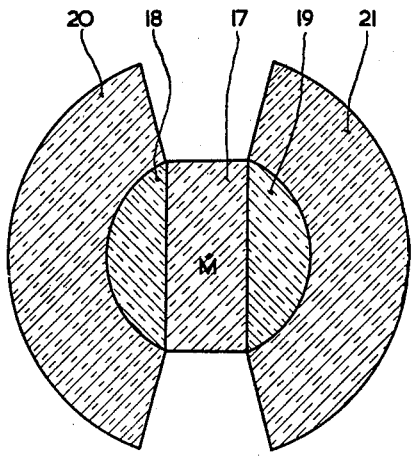
Figure 3:
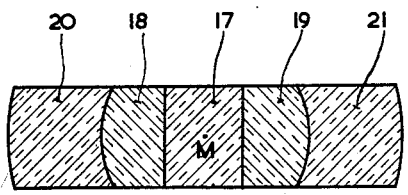
Figure 5:
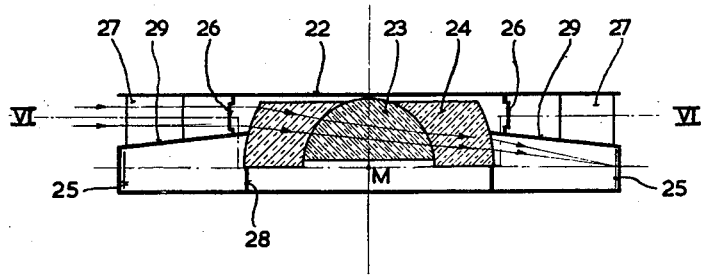
Figure 6:
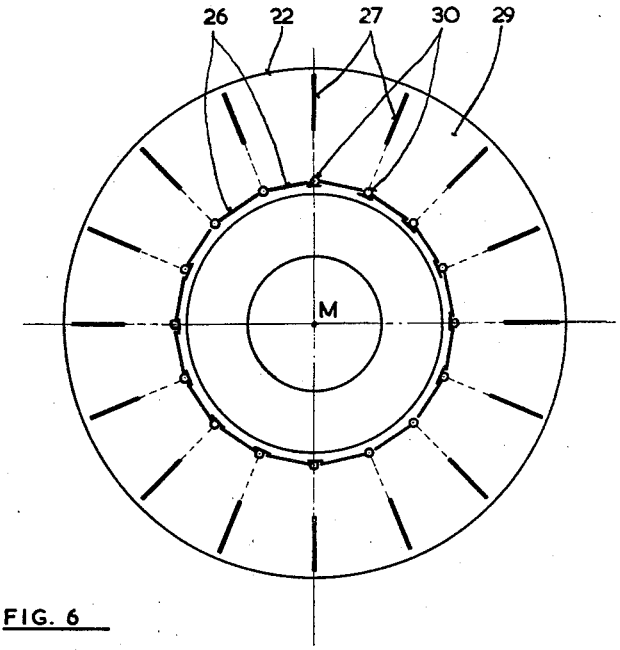
Figure 7:
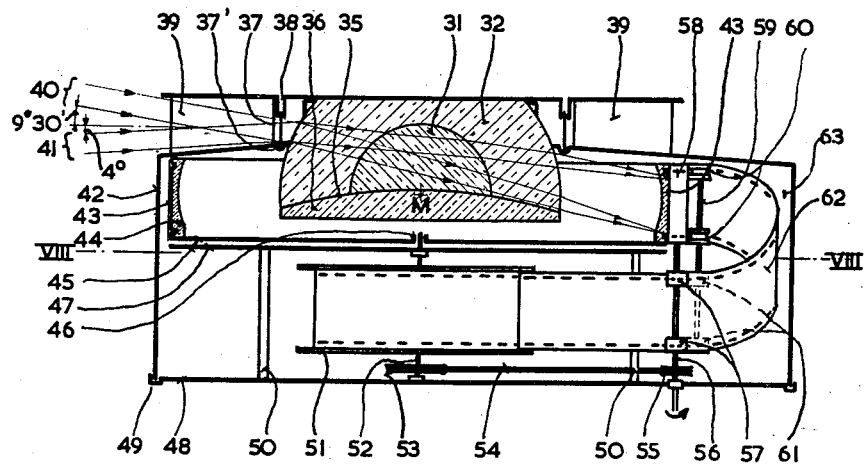
Figure 8:
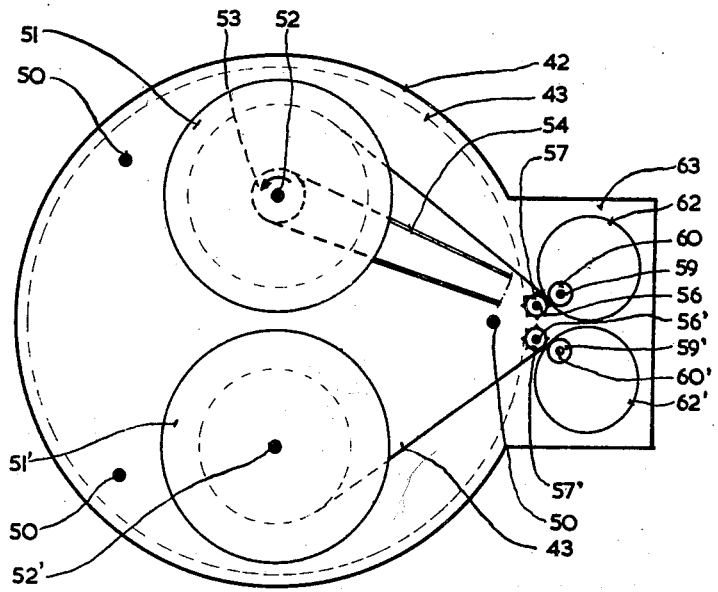

The characteristic features of the invention may be better understood when reading the following description of some of its embodiments with reference to the drawings, in which:

Fig. 1 is an axial section of a panoramic camera constructed in accordance with the invention, with a field of view in one direction of about 130°;

Fig. 2 a section of this camera taken along the plane II—II in Fig. 1;

Fig. 3 an axial section cut in the plane of the smallest field angle of a preferred form of panoramic lens according to the invention;

Fig. 4 the corresponding section cut in the plane of the largest field angle;

Fig. 5 a section of a so-called horizon camera with an image angle in the horizontal direction of 360°;

Fig. 6 a section of the Fig. 5 camera, cut in the plane VI—VI;

Fig. 7 a section of a modified form of the horizon camera;

Fig. 8 a section of the Fig. 7 camera, cut in the plane VIII—VIII.

In Figs. 1 and 2 the panoramic lens is shown mounted inside the camera housing 1, which is generally disk-shaped; the lens comprises the part-spherical glass body 2 which is surrounded by parts 3 and 4 of a spherical shell concentric with the sphere. Although, in the example, use is made of the possibility of gradually reducing the height of the component glass bodies in the direction of the path of the rays, it is obvious that the optical system nevertheless is substantially in the shape of a transparent disk which is a characteristic feature of the invention. An image of an object that is considered in the drawing to be situated at infinity, is projected by the lens on to the film 6, which is unwound from a feed spool 11 and stretched taut over a cylindrically curved film support 5. The film is spooled on to a take up spool 12. The film support has a toric surface on the side facing the optical system, and a purely cylindrical surface on the side facing the film. The thickness of the film support and the radius of curvature of the toric inner surface have been made such that the image surface of the optical system, which is normally spherical in form, becomes distorted into a cylindrical surface. Obviously it is not necessary for the image flattening lens 5 to be used as a film support as well. For the latter purpose a transparent part of a ring having normal cylindrical surfaces may be used, the image flattening lens 5 then being placed some distance in front of it. The arrangement shown in the drawing is, however, to be preferred because, thanks to the short distance between the toric surface and the image face, aberrations caused by the flattening lens are reduced to a minimum.

Mounted in front of the film support 5 is a shutter consisting of a band or tape 7 which is moved to and fro between coils 13 and 14 and which has a vertical slit 7'. In the course of its movement the band is guided along the film by means which are represented only schematically by the guide rails 8 and 9 in Fig. 1.

A number of radially directed plates (or laminae) 10 are placed in front of the entrance surface of the camera lens; these plates are evenly distributed over the effective entrance angle and serve to limit the entering light-beams to the desired width. This width is, of course, determined by the desired luminosity of the camera lens and the degree of correction for aberrations aimed at. In order to illustrate the diaphragm effect of the phates, Fig. 2 shows the light-beams from two different directions which are admitted into the optical system. One direction, A, has been chosen such that it bisects the angle between two adjacent plates, the other one B, corresponds to the direction of one of the stop plates. It will easily be seen that, owing to the shadow effect of the plates, only the beams 15, 15' and 15" will be admitted from direction A, and only beams 16, 16' and 16" from direction B. It is also evident that both the aperture of the system (the distance between the outermost rays from a certain direction admitted by the diaphragm) and the total beam-width (the combined widths of all the partial beams admitted) depend upon the number of plates and the length of the plates. Both magnitudes vary between two values, depending upon the direction of incidence considered, in such a way that the total beam-width for directions parallel to one of the plates is a maximum, whilst for directions midway between two adjacent plates it is a minimum (see respectively directions B and A in Fig. 2). The number of plates and the length of the plates are made such that the aperture for any direction will never be larger than is permissible for obtaining the desired sharpness of definition of the image, whilst at the same time the total beam-width shows the smallest possible deviations from the mean value. These deviations can be reduced to the magnitude of 5% and are therefore of little practical importance.

A camera of the type illustrated in Fig. 1 and Fig. 2 may be very useful in air photography for photogrammetric and reconnaissance purposes. If the camera is suspended in or from the aeroplane in such a way that the plane of the spherical segment is perpendicular to the longitudinal direction of the aircraft and if the camera is directed towards the earth's surface, a very broad strip of the earth's surface situated transversely to the direction of travel can be photographed in one single exposure. In this way, by causing the aircraft to fly in a straight line at a constant speed and by taking a photograph at fixed intervals, a large area can in a very short time be reproduced photographically on a series of film strips which overlap each other in the direction of travel.

Figures 3 and 4 give an embodiment of the panoramic lens, according to the invention, which is particularly easy to manufacture. It consists of five parts cemented to each other. The basic form is again that of a spherical segment, consisting of the spherical shell portions 20 and 21, into the concave sides of which the spherical segments 18 and 19 are cemented. The space between the spherical shell portions thus produced, which are approximately segmental in form, is partly filled by the plano-parallel plate 17 (which is made of the same material as the spherical segments 17 and 18 and hence does not interfere with the concentricity of the system). All of the lens components can be made in a comparatively easy well-known manner, whilst the centring does not involve any special difficulty.

Figures 5 and 6 show schematically a camera according to the invention, which is adapted for an angular field in one direction of 360°, whilst the field in the direction perpendicular thereto is, for instance, 5°. With a camera of this kind the entire horizon can be covered in one single shot. The camera lens is again shaped essentially as a spherical segment and consists of two cemented portions: the spherical segment 23 and the surrounding ring 24, which is part of a spherical shell. This optical system is mounted in a housing 22 shaped essentially as a flat, cylindrical box whose inner space is divided into two different levels by a ring 29 which, fitting around the spherical segment, has a slight conical rise towards the centre. Under the ring 29 is the space through which the rays emerging from the camera lens move towards the film 25, which is placed around the circumference in the form of a cylindrical surface. The light-rays enter on the upper side of the ring 29, where the shutter 26 and the diaphragm 27 are situated, and are refracted downwardly by the optical system 23, 24 as shown in the drawing and made to converge at the required point on the image surface, which is situated in the lower level of the housing.

The corresponding light-rays diametrically positioned points of the horizon run in the same meridional plane and therefore intersect at some point in the camera lens. The outer surface of the spherical segment is divided by the ring 29 into two encircling zones situated one above the other, in the upper of which light enters, whilst in the lower zone the light from the diametrical opposite direction emerges from the system. By this arrangement it is possible to produce all horizontal angular fields between 180° and 360°, it being noted that for intermediate image angles the two zones need not extend around the entire spherical segment but may merely run parallel to each other tangentially over a certain angle.

The stop device in this case consists partly of radially positioned plates 27, the function of which has already been explained herein before with reference to Figures 1 and 2. In the embodiment shown in the drawing the same function is also performed by blades 26 of the shutter fitted behind the diaphragm. These blades 26 are rotatable on spindles 30 and can be actuated jointly by the release mechanism of the camera in a manner not shown in the drawing. For this purpose all the spindles 30 could, for instance, be provided with a cog wheel of large cross-section which is driven by a spindle passing through point M. In the drawing it has been assumed that at each exposure the shutter blades 26 rotate through an angle of over 180°. The blades are shown in the closed position, the open position being indicated by dotted lines. In the latter position the shutter blades are lined up with the corresponding diaphragm plates and thus may perform the same function as the latter. It will be obvious that in certain cases the function of the fixed diaphragm plates can during exposure be taken over entirely by the shutter blades, so that separate diaphragm plates are no longer required. For the prevention of scattered light, an opaque ring-shaped screen 28 is provided.

The data for the optical system of Figures 5 and 6 are as follows: The radius of curvature of the outermost surface of the spherical shell is 56.4 mm., that of the inner surface 28.3 mm. The spherical shell consists of optical glass with $n_D = 1.648$ and a dispersion factor $\nu=34.1$, whilst portion 23 is of glass with $n_D=1.510$ and $\nu=63.8$. The focal length is 100 mm. and the relative aperture 1:5.6. The field is 5 x 360°.

Figures 7 and 8 show sections of another embodiment of the horizon camera according to the invention. The optical system again consists of a partial spherical shell 32 and a partial spherical core 31. The spherical segment thus formed has a concave lower face 35 on which the disk 36 is cemented, the function of which plate will be explained later. The focal length is 102 mm.; the spherical shell 32 has an inner radius of 28.18 mm. and an outer radius of 56.23 mm. The film is standard film of 36 mm. width and has a double perforation. The radius of the lower face 35, which is shown spherical in the drawing, is 200 mm. Disk 36 is made of the same material as the spherical shell 32, viz., glass having $n=1.648$ and $\nu=34.1$. The core 31 is again of glass having $n=1.510$ and $\nu=63.8$.

The shutter is formed by an opaque ring 37 which drops with its lower edge into groove 37' of the partition and can be moved upward via a dark slide 38 by means of appropriate appliances not shown in the drawing. The plates of the diaphragm are indicated as 39.

Fig. 7 shows the light beams 40 and 41 coming from the points in the object plane (considered infinite) which are situated on the outermost boundaries of the vertical angular field. The total vertical field amounts to 13.5°, of which 9.5° is above the horizon and 4° below it. In cases where the aim is to obtain the largest possible field in a vertical direction, this field difference above and below the horizon is due to the presence of the cylindrical film chamber under the entrance zone of the camera lens. Whilst the field below the horizon is on this account bound down to practical limits, the field above the horizon need not for symmetry's sake be limited to the same angle. By displacing the film support 43 downward, the latter has been brought into such a position that its control point is situated under the horizon plane passing through the centre M of the camera lens. This is tantamount to a field angle above the horizon larger than that below the horizon. It is a fortunate circumstance that this angular field difference is in accordance with the demands that will be made upon the camera during normal use. The camera will practically always be mounted at a comparatively small height above the earth for taking photographs on which objects (buildings, trees, mountains) in an area extending a considerable distance around the camera are reproduced in full, whereas the flat foreground in the immediate environment of the camera which is of little value in a panorama does not appear on the photo.

By giving the film support a suitable construction in the shape of an image flattening lens 44, it has been ensured that the image surface will remain cylindrical even if the film 43 is positioned asymmetrically with respect to the camera lens.

As can be seen from Fig. 7 the comparatively large field of the camera in a vertical direction has the effect that the outermost beam 40 passes practically along the lower face of the spherical segment. It is not desirable to shift this lower face further downward, as in that case the spherical shell 32 could no longer be made in one piece. As already mentioned, an unduly high reflection from the lower face 35 of the spherical segment has, according to the invention, been prevented by the fact that this face has been ground to a concave form and is provided with the disk 36, cemented to it, which is made of a material having practically the same index of refraction. On its underside the disk is of course finished in such a way as to minimize any possible reflection of light diffused through the system. For the sake of completeness it may be noted that reflection-resisting disks like 36 can, if necessary, be placed against the two end faces as well or only against the upper face of the spherical segment.

Figures 7 and 8 reproduce schematically a special arrangement for the film conveyance system whereby the feed spool and the take-up spool of the camera are mounted underneath the optical system instead of beside it, thus permitting a very compact construction of the camera housing. In view of this the film is fed to the film support and removed after exposure in loops.

Item 42 in the figures is the camera housing, on one side of which there is an extension 63 containing the film loops. The bottom edge of the housing closes light-tight in a channel 49 of a bed plate 48. Joined to this bed plate by pins 50 is a chassis plate 47, which is kept at a distance by the metal pins. Supported by these two plates 47 and 48 is the film conveyance mechanism, consisting of the sprockets 57, 58, 57', 58' and the pressure rollers 60, 61, 60', 61' bearing upon them. For the sake of clarity in the drawing the details of the pivots have been omitted. Sprockets 57, 58 on the pulling side are rigidly mounted on the spindle 56, which is led out through the bed plate 48 and can be driven by suitable external agencies not shown in the drawing. The corresponding sprockets at the feed end 57', 58' are mounted on a spindle 56' which is not driven. Mounted on the spindle 59, which is pivotally mounted in spring-loaded levers not shown in the drawing, are pressure rollers 60, 61, which rotate freely and which serve to prevent the film from running off the sprockets. The pressure rollers 60', 61' (which are not visible in the figure) co-operate in a similar manner with the sprockets 57', 58'. Between the plates 47 and 48 are also the take-up spool 51 and the film feed spool 51'. The spindle 52 of the first-mentioned spool is slip-driven via a rope drive 53, 54, 55 by the sprocket shaft 56, the film being thereby kept taut. The feed spool 51' rotates freely on the spindle 52'.

The film carrier 44 is mounted on a flat, circular table 45, which at 46 is pivotally mounted on to the chassis plate 47. The film 43 runs off the feed spool 51', passes between the sprockets 57 and the pressure rollers 61, after which it is formed into a loop 62' of 360° and thus becomes positioned at the same height as the film carrier of the camera. Passing between the sprockets 58' and the pressure rollers 60' (not visible in the figure), the film comes into the image surface, is stretched taut around the film carrier over an angle of nearly 360° and is finally guided in a similar manner, by means of sprockets 57, 58 and pressure rollers 60, 61, to the take-up spool 51.

It will be clearly seen, that the rotatable mounting of the film carrier 44 shown in the drawing, avoids all mutual motion between the film and film carrier which might cause damage to the film. After each exposure the table 45 together with the film carrier 44 makes a complete revolution during which the exposed portion of the film is wound off the carrier and a fresh piece of film taken up.

It goes without saying that the examples given do not exhaust the possibilities of the invention either as regards the lens or as regards further technical provisions of the camera. It should be noted in particular that, with a view to obtaining the desired state of correction, the optical system may be made up of a larger number of elements than are shown in the drawing; it may, for instance, comprise several spherical shells or shell portions made of different grades of glass.

I claim:

1. A panoramic camera comprising a housing having an aperture therein, an optical system substantially in the shape of a transparent disk having spherical external and internal refractive surfaces whose centers of curvature are substantially coincident, a first area of said spherical external surface being disposed opposite said aperture in said housing so as to be exposed to incident light rays and to serve as an entrance surface of said optical system for such light rays, a second area of said spherical external surface opposite said first area serving as an exit surface of said optical system for light rays having traversed said optical system, a film carrier in the path of said light rays opposite to and spaced from said exit surface for carrying on its outer surface a strip of film, said film carrier having its axis passing through said coinciding centers of curvature, and stop means mounted in the path of the light rays before said entrance surface for preventing incident light rays not substantially radial to said spherical, external and internal surfaces from entering said optical system.

2. A panoramic camera as claimed in claim 1 wherein said optical system comprises a central transparent body in the shape of a portion of a sphere having substantially plane top and bottom end faces, a portion of a transparent spherical shell whose outer spherical surface defines said entrance surface of said optical system and whose inner spherical surface substantially coincides with one area of the spherical surface of said central body, and another portion of a spherical shell whose outer spherical surface defines said exit surface of said optical system and whose inner spherical surface substantially coincides with another area of the spherical surface of said central body radially opposite said one area, said portions of spherical shells having substantially plane top and bottom faces.

3. A panoramic camera as claimed in claim 2, wherein said central body is made up of a thick plane-parallel plate of rectangular shape and a pair of spherical segments having said plane-parallel plate between them, said plane-parallel plate and said spherical segments being of the same transparent material.

4. A panoramic camera as claimed in claim 1 wherein said optical system comprises a central transparent body in the shape of a portion of a sphere having a substantially plane bottom face and a transparent spherical shell surrounding said central body and having substantially plane top and bottom end faces, said transparent spherical shell having on its outer spherical surface said entrance and exit surfaces of said optical system.

5. A panoramic camera as claimed in claim 1 wherein said optical system comprises a central body, in the shape of a portion of a sphere having a substantially plane bottom surface and a number of transparent spherical shells surrounding said central body and having substantially plane top and bottom end faces, the outermost of said transparent shells having on its outer spherical surface said entrance and exit surfaces of said optical system.

6. A panoramic camera as claimed in claim 1 wherein there is interposed in the path of the light rays between said optical system and said film carrier a transparent body whose inner surface facing said optical system is concave-toric in form, whereby the image surface of said optical system is made cylindrical.

7. A panoramic camera as claimed in claim 6, wherein the outer surface of said transparent body is cylindrical and serves as said film carrier.

8. A panoramic camera as claimed in claim 1 wherein there is interposed in the path of the light rays between said optical system and said film carrier a transparent body whose outer surface facing said film carrier is concave-toric in form whereby the image surface of said optical system is made cylindrical.

9. A panoramic camera as claimed in claim 1 wherein said stop means comprises a plurality of thin, opaque, flat plates evenly distributed over said entrance surface of said optical system, said plates being in planes substantially radial with respect to said axis of said film carrier.

10. A panoramic camera as claimed in claim 9, wherein said stop plates are rotatable and act as shutter blades.

11. A panoramic camera as claimed in claim 1, having a shutter in the form of a portion of a ring located in the path of the light rays substantially coaxially with said film carrier and reciprocable vertically.

12. A panoramic camera as claimed in claim 1, having a shutter comprising a plurality of thin, opaque blades spaced at regular distances from each other in front of said entrance surface of said optical system, said blades being rotatably mounted on spindles substantially parallel to said axis of said film carrier, and means for moving said blades from the rest position at which they shut off light from the entrance surface of said optical system to the radial position required for exposure.

13. A panoramic camera as claimed in claim 1 wherein said film carrier is mounted in said housing for free rotation about its axis whereby during transport of said strip of film said film carrier may be made to rotate at the same speed as said strip of film.

References Cited in the file of this patent

UNITED STATES PATENTS

| | | |
|---|---|---|
| 2,352,801 | Rolph | July 4, 1944 |
| 2,713,809 | Cook | July 26, 1955 |

FOREIGN PATENTS

| | | |
|---|---|---|
| 6,870 | Switzerland | May 23, 1893 |